United States Patent [19]

Kelly

[11] Patent Number: 4,830,650
[45] Date of Patent: May 16, 1989

[54] FLEXIBLE RING MOLD AND METHOD OF USE

[75] Inventor: Joseph B. Kelly, Crestline, Ohio

[73] Assignee: PPG Industries, Inc., Pittsburgh, Pa.

[21] Appl. No.: 140,527

[22] Filed: Jan. 4, 1988

[51] Int. Cl.⁴ ............................................. C03B 23/03
[52] U.S. Cl. ....................................... 65/106; 65/273; 65/287
[58] Field of Search ................. 65/106, 273, 287, 289

[56] References Cited

U.S. PATENT DOCUMENTS

| | | | |
|---|---|---|---|
| 3,459,526 | 8/1969 | Stickel et al. | 65/289 |
| 3,479,540 | 11/1969 | Ritter, Jr. et al. | 65/107 |
| 3,527,589 | 9/1970 | Ritter, Jr. et al. | 65/289 |
| 4,272,274 | 6/1981 | Frank et al. | 65/273 |
| 4,579,577 | 4/1986 | Claassen | 65/273 |

FOREIGN PATENT DOCUMENTS 626211  8/1961  Canada ................................. 65/287

Primary Examiner—Arthur Kellogg
Attorney, Agent, or Firm—Andrew C. Siminerio

[57] ABSTRACT

A heat softened glass sheet is shaped between a contoured upper mold and a flexible lower ring mold. The flexible shaping surface of the lower mold has a generally flat surface configuration as it initially contacts and lifts the peripheral portions of the glass sheet off a series of conveying rolls. The lower mold continues to bias the glass sheet against the upper mold and deforms to substantially compliment a corresponding peripheral portion of the contoured upper mold.

10 Claims, 3 Drawing Sheets

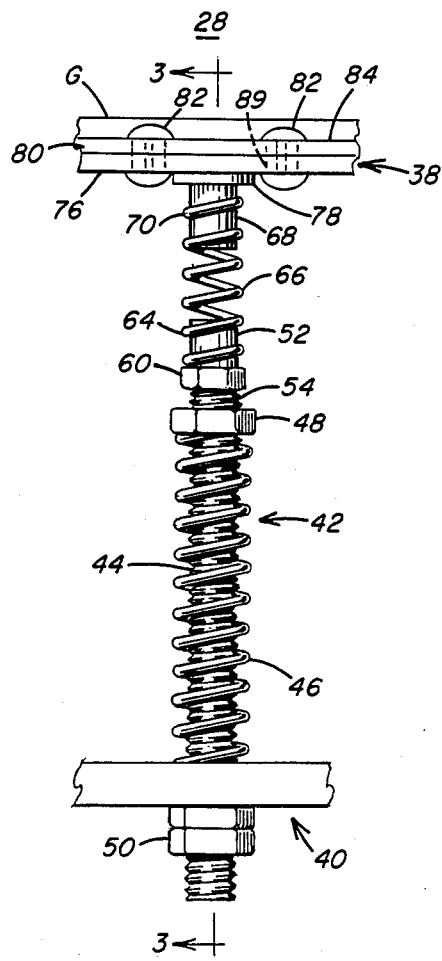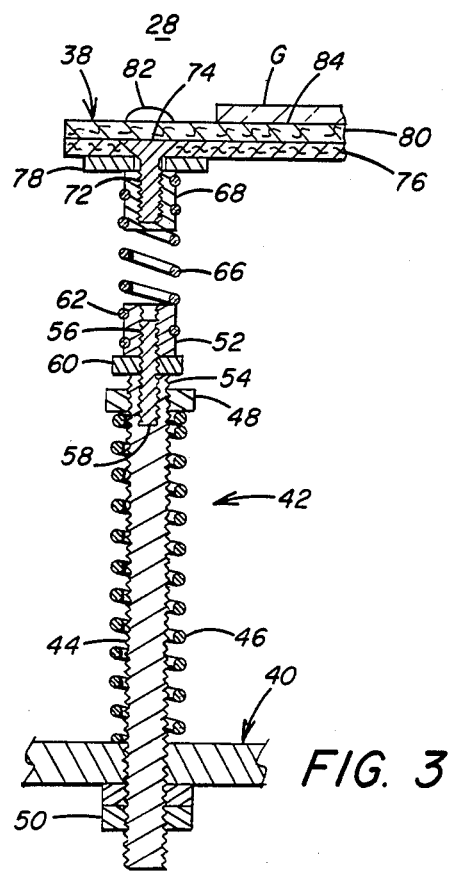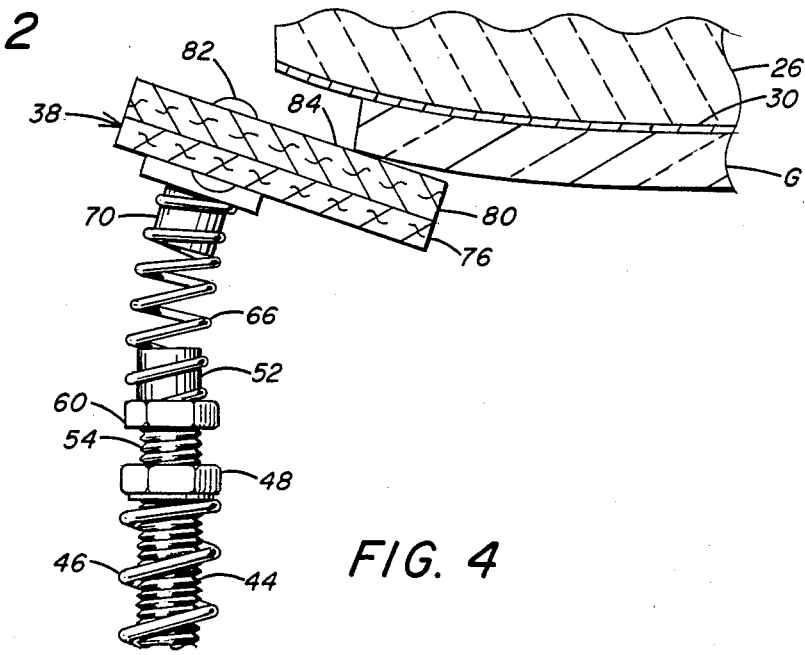
FIG. 2
FIG. 3
FIG. 4

FLEXIBLE RING MOLD AND METHOD OF USE

BACKGROUND OF THE INVENTION

1. Field of the Invention

This invention relates to the shaping of heat softenable sheet material, and in particular to shaping heat softened glass sheets between an upper mold and a lower, flexible ring mold.

2a. Technical Considerations

Shaped and tempered glass sheets are widely used as windows in vehicles, such as automobiles and the like. To fabricate these windows, flat glass sheets must be shaped to precisely defined curvatures dictated by the shape and outline of the window frame openings in the vehicle. It is important that the windows meet stringent optical requirements and be free of optical defects that would tend to interfere with clear viewing through the window. Any distortion in the shaping members that engage the heat softened sheet is replicated in the major surface of the sheet and may result in an optically deficient surface in the shaped sheet.

Commercial production of shaped glass sheets commonly includes heating flat glass sheets to their softening temperature, shaping the heated sheets to the desired curvature, and then cooling the shaped glass sheets in a controlled manner. In particular, the glass sheets are serially conveyed through a tunnel type furnace and heated to their heat deformation temperature and thereafter conveyed into a shaping station where the heat softened glass sheets are sandwiched between a pair of vertically aligned upper and lower shaping molds. After shaping, the molds separate with the shaped glass sheet remaining engaged against the upper mold by vacuum. A transferring tempering ring having an outline shape and conforming to the desired curvature of the glass sheets slightly inboard of its perimeter moves below the upper mold which thereafter releases the vacuum and deposits the shaped glass sheet on the ring. The tempering ring then conveys the shaped glass sheet into the cooling station for tempering.

The lower mold in such sheet shaping arrangements is generally positioned below the conveying rolls in the shaping station and has a segmented, curved sheet engaging surface complementing selected surface portions of the upper shaping mold. During shaping, the lower mold moves upward and lifts the glass sheet off the conveying rolls and into engagement with the upper mold. During engagement with the lower mold, the glass first engages the highest portions of the lower mold and then slides along the mold surface to conform therewith. As a result, there is a possibility of marking the glass as the glass slides along the lower mold face.

It would advantageous to construct a lower mold that would engage the heat softened glass sheet in a manner so as to eliminate the glass sheet sliding over the lower mold during shaping.

2b. Patents of Interest

U.S. Pat. Nos. 3,459,526 to Stickel et al., 3,476,540 to Ritter, Jr. et al., and 3,527,589 to Ritter, Jr., teach a horizontal press bending arrangement with an upper mold and a lower outline ring type mold. The lower mold is interrupted to provide clearance for the mold to move through a plane occupied by a series of spaced conveying rolls in the shaping station. The elevational configuration of the lower outline mold corresponds to a complementing portion of the upper shaping mold.

U.S. Pat. No. 4,272,274 to Frank et al., teaches a horizontal press bending arrangement with an upper vacuum mold and a slotted lower mold. The lower mold includes a plurality of smoothly curved, upwardly facing, elongated shaping members extending continuously across the entire dimension of the mold, and separated by transversely extending grooves that extend completely across the entire dimension of the shaping mold. The grooves have sufficient width and depth to permit clearance for raising the mold from below a series of conveying rolls within the shaping station to above the conveying rolls to lift and press a heat softened glass sheet against the upper mold.

SUMMARY OF THE INVENTION

The present invention provides a glass sheet shaping apparatus with a ring type mold that adjusts and generally conforms to the contoured surface of a shaping mold as the glass is pressed therebetween. The ring mold is mounted on a compliant support assembly that includes a pair of springs that allows the flexible shaping surface of the ring mold to rotate, deflect, and translate. During operation, the ring mold moves from a first position wherein the mold engages a heat softened glass sheet while the mold has a generally flat shaping surface configuration, to a second position wherein the glass sheet is pressed against the contoured surface of the shaping mold and the flexible surface of the ring mold progressively conforms to the contours of a corresponding portion of the shaping mold during pressing.

BRIEF DESCRIPTION OF THE DRAWINGS

FIG. 2 is an elevational view of the spring mounted support arrangement of the flexible shaping ring of the present invention, with portions removed for clarity.

FIG. 3 is a cross-sectional view through line 3—3 of FIG. 2.

FIG. 4 is a view similar to that in FIG. 3 showing a glass sheet supported and pressed against an upper mold by the flexible shaping ring of the present invention.

DETAILED DESCRIPTION OF THE INVENTION

The present invention is taught in conjunction with its use in shaping heat softened glass sheets, but it is understood that the invention may be used in any type of heat softened sheet material shaping arrangement.

Figure 1:
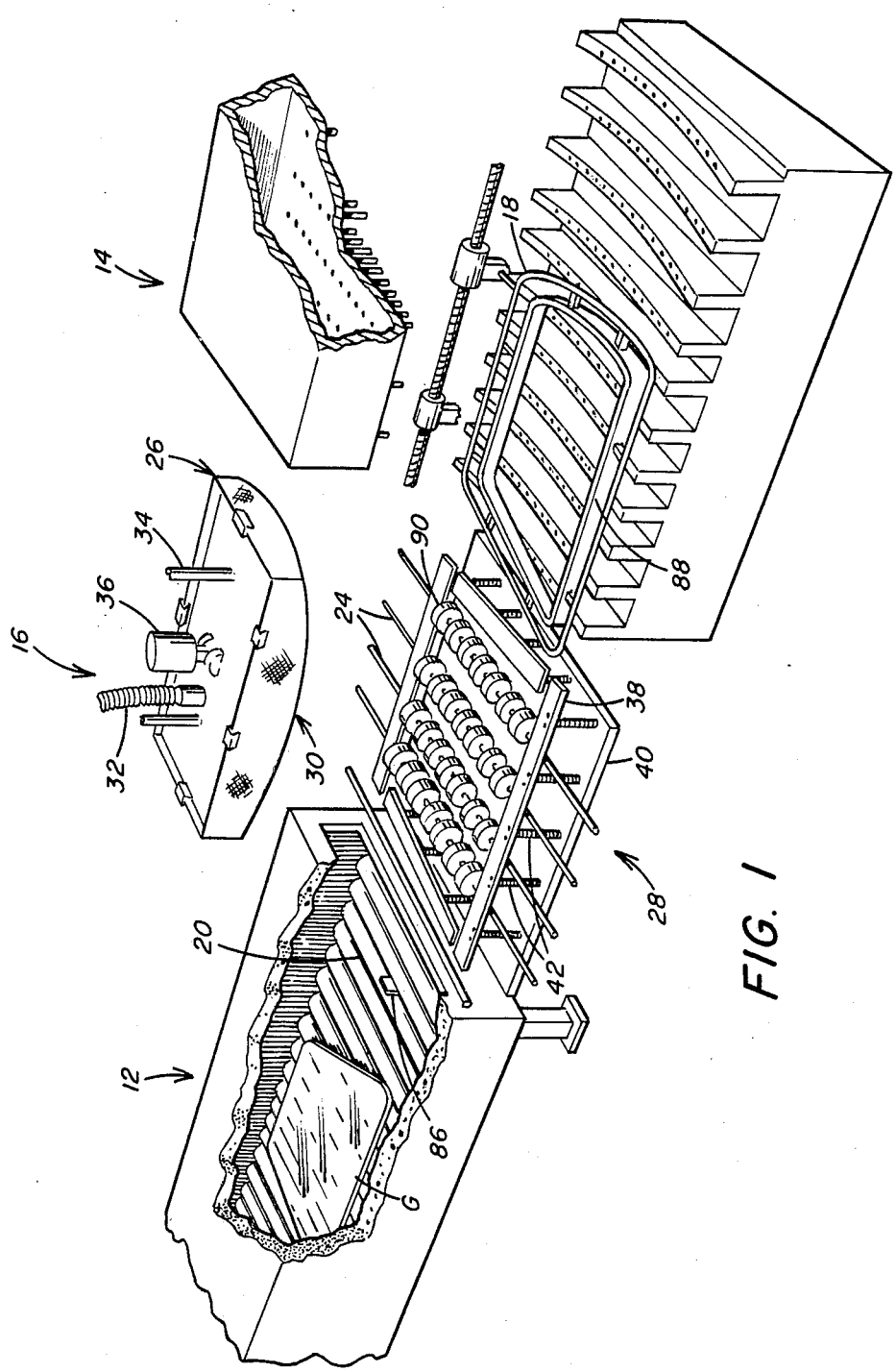
FIG. 1 is a partly fragmentary prospective view looking upstream at a glass sheet bending arrangement incorporating the teachings of the present invention.

Referring to FIG. 1, an apparatus for treating and shaping sheets of heat softenable material, such as glass, includes a furnace 12 through which glass sheets G are serially conveyed from a loading station (not shown) to heat the glass to its deformation temperature. A cooling station 14 for cooling the curved sheets of glass and an unloading zone (not shown) beyond the cooling station 14 are located in an end-to-end relation downstream from the furnace 12. An intermediate or shaping station 16 is disposed between the furnace 12 and the cooling station 14. A sheet transfer means 18 located at the cooling station 14 transfers the shaped and tempered glass sheet downstream for transport to the unloading station.

The furnace 12 includes a horizontal conveyor 20 with longitudinally spaced, transversely extending conveyor rolls 22 that define a path of travel which extends through the furnace 12. The rolls 22 of the conveyor 20 are arranged in sections and their rotational speed controlled through clutches (not shown) so that the speed of each conveyor section may be controlled and synchronized in any convenient manner.

The shaping station 16 includes a series of spaced donut shaped support rolls 24 to support the heat softened glass sheet G as it exits the furnace 12 and enters the shaping station 16, and also includes an upper shaping mold 26 and a lower shaping mold 28, which is the subject of the present invention. Although not limited in the present invention, upper mold 26 is similar to that taught in U.S. Pat. No. 4,579,577 which teachings are incorporated by a reference. The shaping surface 30 of the mold 26 is shaped to conform with the shape desired for the glass sheet to be shaped. With continued reference to FIG. 1, the upper vacuum mold which communicates with a vacuum source (not shown) through an evacuation pipe 32 and suitable valve means (not shown), is suitably connected through upper vertical guide rods 34 to a support frame (not shown), and is vertically moveable via a piston arrangement 36 relative to the frame. The evacuation pipe 32 may be connected through a suitable valve arrangement to a source of pressurized air (not shown). The valve for the vacuum line and for the pressure line may be synchronized according to a predetermined time cycle in any convenient manner.

Referring the FIGS. 1 through 3, the lower mold 28 includes a flexible ring 38 that is generally flat when engaging the heat softened glass sheet and generally conforms to the peripheral curvature of the upper mold 26 during pressing. The flexible ring 38 is supported on mounting plate 40 by compliant support assemblies 42. Referring in particular to FIGS. 2 and 3, each assembly 42 includes a support bar 44 extending through mounting plate 40 with a main spring 46 extending along the support bar 44. Main spring 46 is captured on the bar 44 by an upper nut 48 and lower lock nuts 50. Collar 52 is secured to the upper end 54 of bar 44. Although not limiting in the present invention, in the particular embodiment illustrated in FIG. 3, threaded shaft 56 is received within a threaded cavity 58 at the upper end 54 of bar 44 and is secured in place by lock nut 60. Collar 52 is threaded over the opposing end of shaft 56. Collar 52 includes a spiral groove 62 along its surface to engage the lower end 64 of a support spring 66. Collar 68, which is similar to collar 52, engages the upper end 70 of support spring 66. Shaft 72, which includes an enlarged head member 74 that engages a lower board 76 of the flexible ring 38, extends through washer 78 and is secured to collar 68. Upper board 80 is secured to the lower board 76, for example by rivets 82, so that as boards 76 and 80 flex during pressing. As will be discussed later, the boards 76 and 80 may slide relative to each other.

Boards 76 and 80 should be sufficiently rigid to support the heat softened glass sheet G as it is engaged by the lower mold 28 but also sufficiently flexible to conform to the peripheral configuration of the upper mold 26, as will be discussed later. In addition, upper board 76 and preferably both boards should be heat resistant. In one particular embodiment of the invention, boards 76 and 80 were ⅛ inch (0.32 cm) thick Spauldite® ARK-2 aramid laminate available from Spaulding Fibre Company, Inc., New York.

Mounting plate 40 is secured to an elevator means (not shown) so that the flexible ring 38 may be vertically reciprocated from an initial position, wherein the sheet engaging surface 84 of the flexible ring 38 is positioned below support rolls 24 in shaping station 16, to a second position above the support rolls 24 to shape the glass sheet, as will be discussed later.

Support assembly 42 allows the flexible ring 38 to engage and conform to the shaping surface 30 of the upper mold 26. Referring to FIG. 4, support spring 66 operates as a universal joint, i.e., it allows flexible ring 38 to pivot about any axis and adjust to the shaping surface 30 of the upper mold 26. In addition, the main spring 46 has a spring constant that is sufficiently stiff to apply pressure to the flexible ring 38 and bend it as it is pressed against the upper mold 26 while remaining flexible enough so as not to mark the peripheral edge of the glass sheet G or squeeze it during shaping.

Figure 5:
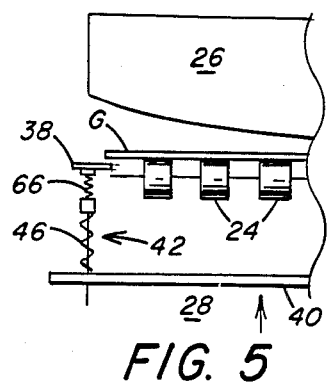
FIGS. 5 through 10 are schematics illustrating the operation of the flexible shaping ring of the present invention to lift and press heat softened glass sheets against an upper shaping mold.
Figure 6:
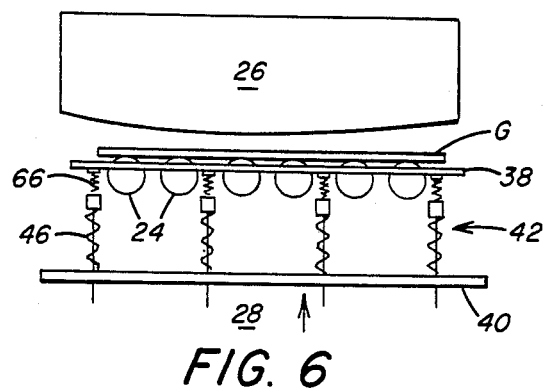
Figure 7:
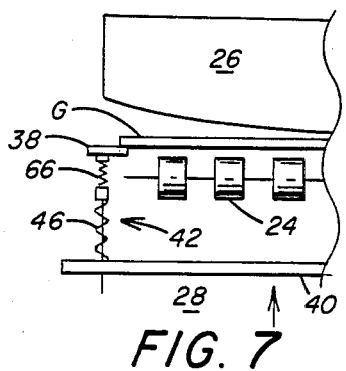
Figure 8:
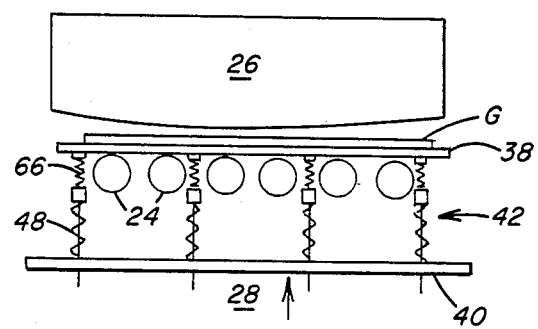
Figure 9:
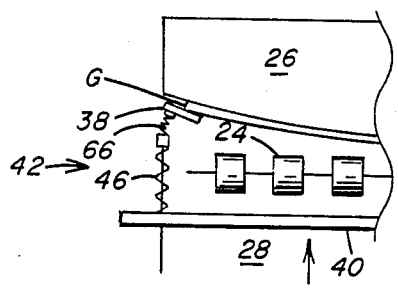
Figure 10:
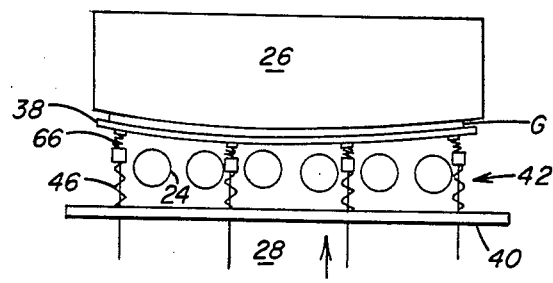

Referring to FIGS. 1 and 5 through 10, in operation, a glass sheet G is conveyed through the furnace 12 to heat the sheet G to its heat softening temperature. Sensor 86 (shown in FIG. 1 only) senses the position of the glass sheet G and sends this information to a controller (not shown) which controls the conveying rates of rolls 22 in furnace 12 and rolls 24 in the shaping station 16. As the glass sheet G exits the furnace 12 and is conveyed to the shaping station 16, the flexible ring 38 of the lower mold 14 is positioned below the upper conveying surface of the support rolls 24 so that the glass may be conveyed therethrough without interference as shown in FIGS. 5 and 6. When the glass sheet G is in proper position between the upper mold 26 and lower mold 28, lower mold 28 moves upward lifting the glass sheet off rolls 24 as shown in FIGS. 7 and 8. It should be noted that as the flexible ring 38 initially contacts the glass sheet G, the ring 38 is essentially flat so that it simultaneously contacts the entire edge of the glass sheet G to be shaped. The lower mold 28 continues to move upward to press the heat softened glass sheet G against the upper mold 26 as shown in FIGS. 9 and 10. As the glass sheet G on lower mold 28 begins to engage the peripheral portions of the shaping surface 30 of upper mold 26, main springs 46 compress and support springs 66 rotate. The glass sheet G initially contacts the lowest peripheral surface elevation of the mold 26 and as the lower mold 28 continues to press upwardly, the ring 38 flexes both rotationally as shown in FIG. 9 and longitudinally as shown in FIG. 10, and progressively deforms so that the peripheral portion of the glass sheet G conforms to the corresponding portion of the upper vacuum mold 26.

After shaping, the lower mold 28 is lowered and the shaped glass sheet G is held against the upper mold 26 by vacuum. The sheet transfer means 18, such as a tem- per ring 88, is then positioned beneath the upper vacuum mold 26 to receive the shaped glass sheet G. The vacuum is then discontinued and the glass sheet G is supported on the tempering ring 88, which thereafter conveys the shaped glass sheet G to the shaping station 16 where the glass sheet G is controllably cooled to a temperature below its strain point temperature to temper the glass.

Referring to FIG. 4, it should be noted that the flexible ring 38 is sufficiently wide so that the riveted connection 82 between the upper board 76 and lower board 80 will not contact the glass sheet periphery sandwiched between the upper and lower molds. To help facilitate ease of flexing of the ring 38, the upper board 80 may include an enlarged opening or a slot 89 through which rivets 82 extend so as to allow the upper board 80 to more freely slide over the lower board 78. In addition, ring 38 actually engages and presses the peripheral edge of the glass sheet G against the upper mold 26 so as to ensure proper glass sheet configuration about its periphery.

The donut shaped rolls 24 accommodate the use of different shaped lower mold 28. Individual donut support 90 are slidably positioned along the convey shaft so that a space may be provided between adjacent supports 90 for the ring 38. As can be appreciated by one skilled in the art, standard conveyor rolls of reduced transverse length may be used within the perimeter of the ring 38 to support the glass sheet G. In addition, if required, additional donut supports (not shown) may be used outboard of the ring 38 perimeter if the shape of the glass G to be shaped requires that its perimeter be supported outboard of selected portions of the ring 38 as it is conveyed thereover.

Although not limiting in the present invention, it is preferred that support spring 66 be stiffer, i.e., have a higher spring constant, than main spring 46 so that spring 46 will assume more vertical compression than support spring 66 during pressing and support spring 66 will act principally as a rotating member rather than a vertically compressing member. Various combinations of spring constants have been used successfully without marking the perimeter of the heat softened glass sheet G during the shaping operation. Although not limiting in the present invention, the spring constant for the main springs 46 has been varied between 7½ to 20 pounds per inch (1.34 to 3.58 kilograms per centimeter) and the spring constant for the support spring 66 has been varied between 50 to 150 pounds per inch (8.95 to 26.84 kilograms per centimeter).

The form of the invention shown and described in this disclosure represents an illustrative preferred embodiment thereof. It is understood that various changes may be made without departing from the gist of the invention except insofar as defined in the claim subject matter that follows.

I claim:

1. A ring type mold for press shaping heat softenable sheet material, said mold comprising:
   a flexible shaping surface to support the peripheral edge of said sheet; and
   means operatively connected to said flexible shaping surface to permit reorientation of said flexible shaping surface as said peripheral edge of said sheet is pressed between said flexible surface and a contoured surface of a shaping mold wherein said operatively connected reorientation means allows translational and rerotational movement of said flexible shaping surface such that said shaping surface can generally conform to said contoured surface of said shaping mold.

2. The mold as in claim 1, wherein said reorientation means includes a plurality of spring member secured to said flexible shaping surface.

3. The mold as in claim 2 wherein said reorientation means further includes a plurality of ring supports secured to said operatively connected spring members, including a shaft extending through and slideably secured at one end to a mounting plate and further including a support spring extending along said shaft and captured between said plate and a securing means positioned at an opposing end of said shaft.

4. The mold as in claim 3 wherein said ring mold and said shaping are a pair of vertically aligned molds and said shaping mold is an upper vacuum mold.

5. A glass sheet shaping apparatus comprising:
   a first mold having a contoured shaping surface;
   a second mold having a flexible shaping surface to support the peripheral edge of a sheet of heat softened material;
   means to move said molds relative to each other wherein said second mold, as said molds move toward each other, biases said peripheral edge of said sheet to be shaped against said contoured shaping surface of said first mold; and
   means operatively connected to said flexible shaping surface to permit translational and rotational reorientation of said flexible surface when said second mold is biased against said first mold wherein said flexible shaping surface of said second mold develops a shape substantially similar to the shape of a corresponding portion of said contoured shaping surface of said first mold.

6. The apparatus as in claim 5 wherein said first mold is an upper mold having a contoured shaping surface conforming to the final desired configuration of said glass sheet to be shaped and said second mold is a vertically aligned lower ring mold, and said moving means includes means to move said lower mold from a first position wherein said flexible surface of said lower mold has an essentially flat configuration, to a second position wherein said flexible surface contacts said peripheral portion of said glass sheet and presses it against said corresponding portion of said upper mold.

7. The apparatus as in claim 6 wherein said operatively connected reorientation movement means includes a plurality of deformable supports including a first spring secured at one end to said flexible surface and an opposing end secured to the upper end of a support shaft and further including a second spring extending along said shaft and captured between said upper end of said shaft and a lower mold mounting plate, wherein as said lower mold presses said sheet against said upper mold, said first spring allows said flexible surface to translate and rotate and said second spring compresses and biases said flexible surface against said upper mold shaping surface.

8. A method of shaping heat softened sheet material comprising:
   engaging peripheral portions of said sheet with a ring type mold having a flexible sheet engaging shaping surface while said shaping surface has a generally flat surface configuration;
   moving said ring mold with said glass sheet supported thereon into contact with a contoured surface of a shaping mold; and
   progressively biasing said flexible surface against said contoured shaping surface of said shaping mold with said heat softened sheet therebetween; while
   progressively translating and rotating said flexible shaping surface as said sheet contact said second mold during said biasing step so as to reorient and substantially conform said flexible surface of said ring mold to said contoured shaping surface of said shaping mold.

9. The method as in claim 8 wherein said translating and rotating step includes supporting said flexible surface with a plurality of spring supports and allowing said spring supports to compress and bias said flexible surface against said shaping mold's contoured surface to substantially conform said flexible surface with a corresponding portion of said shaping mold's contoured surface.

10. A ring type pressing mold comprising;
flexible shaping surface;
a plurality of spring members secured to said flexible shaping surface wherein said spring members allow translational and rotational movement of said flexible surface;
a plurality of ring support secured to said spring members, including a shaft extending through and slideably secured at one end to a mounting plate and a support spring extending along said shaft and captured between said plate and a securing means positioned at an opposing end of said shaft; and
means acting on said mold to contact said flexible surface with the peripheral edge of a sheet of heat softened material and press said sheet into engagement with a contoured surface of a second shaping mold wherein said spring members and ring supports cooperate to permit reorientation of said flexible surface as said flexible surface presses said sheet against said contoured surface of said second mold to generally conform said flexible shaping surface to said contoured surface of said shaping mold.

* * * * *

UNITED STATES PATENT AND TRADEMARK OFFICE
CERTIFICATE OF CORRECTION

PATENT NO. : 4,830,650
DATED : May 16, 1989
INVENTOR(S) : Joseph B. Kelly

It is certified that error appears in the above-identified patent and that said Letters Patent is hereby corrected as shown below:

Claim 1, line 11, "rerotational" should be --rotational--.

Claim 2, line 2, "member" should be --members--.

Claim 3, line 1, after "said" insert --operatively connected--; line 3, delete "operatively connected".

Claim 4, line 2, after "shaping" insert --mold--.

Claim 8, line 14, delete "contact" and insert --contacts--.

Claim 10, line 2, before "flexible" insert --a--; line 7, delete "support" and insert --supports--.

Signed and Sealed this

Third Day of July, 1990

*Attest:*

HARRY F. MANBECK, JR.

*Attesting Officer*     *Commissioner of Patents and Trademarks*